No. 685,992. Patented Nov. 5, 1901.
F. LACEY.
HARNESS OPERATING MECHANISM FOR LOOMS.
(Application filed May 23, 1901.)
(No Model.) 6 Sheets—Sheet 1.

Witnesses:
Oscar F. Hill
A. F. Randall

Inventor:
Fred Lacey
By Macleod Calver & Randall
Attorneys

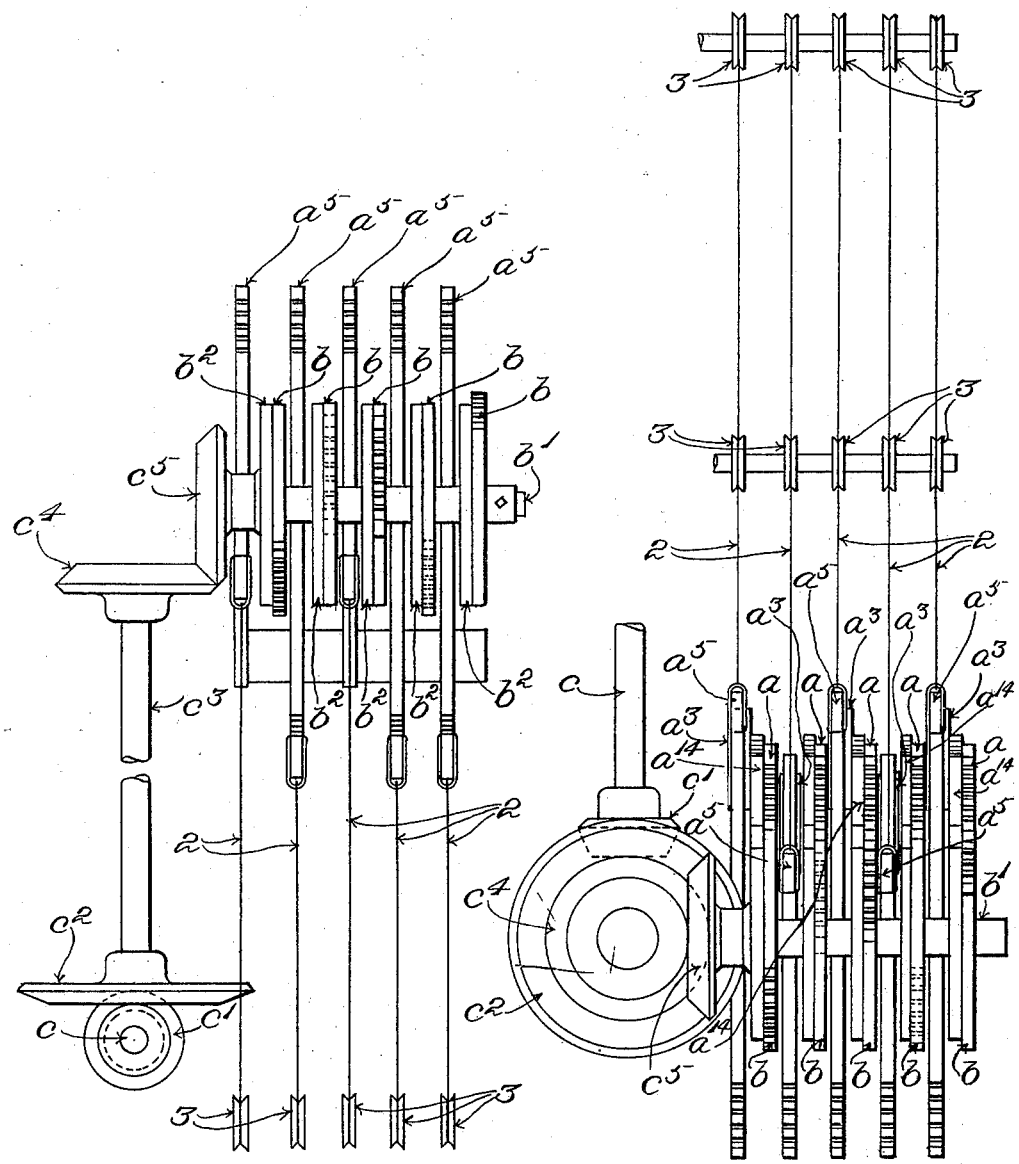

No. 685,992. Patented Nov. 5, 1901.
F. LACEY.
HARNESS OPERATING MECHANISM FOR LOOMS.
(Application filed May 23, 1901.)

(No Model.) 6 Sheets—Sheet 3.

Witnesses: Inventor:
Oscar F. Hill Fred Lacey
A F Randall By Macleod Calvert & Randall
Attorneys.

No. 685,992. Patented Nov. 5, 1901.
F. LACEY.
HARNESS OPERATING MECHANISM FOR LOOMS.
(Application filed May 23, 1901.)
(No Model.) 6 Sheets—Sheet 5.

Witnesses:
Oscar F. Hill
A F Randall

Inventor:
Fred Lacey
By Macleod Calver & Randall
Attorneys.

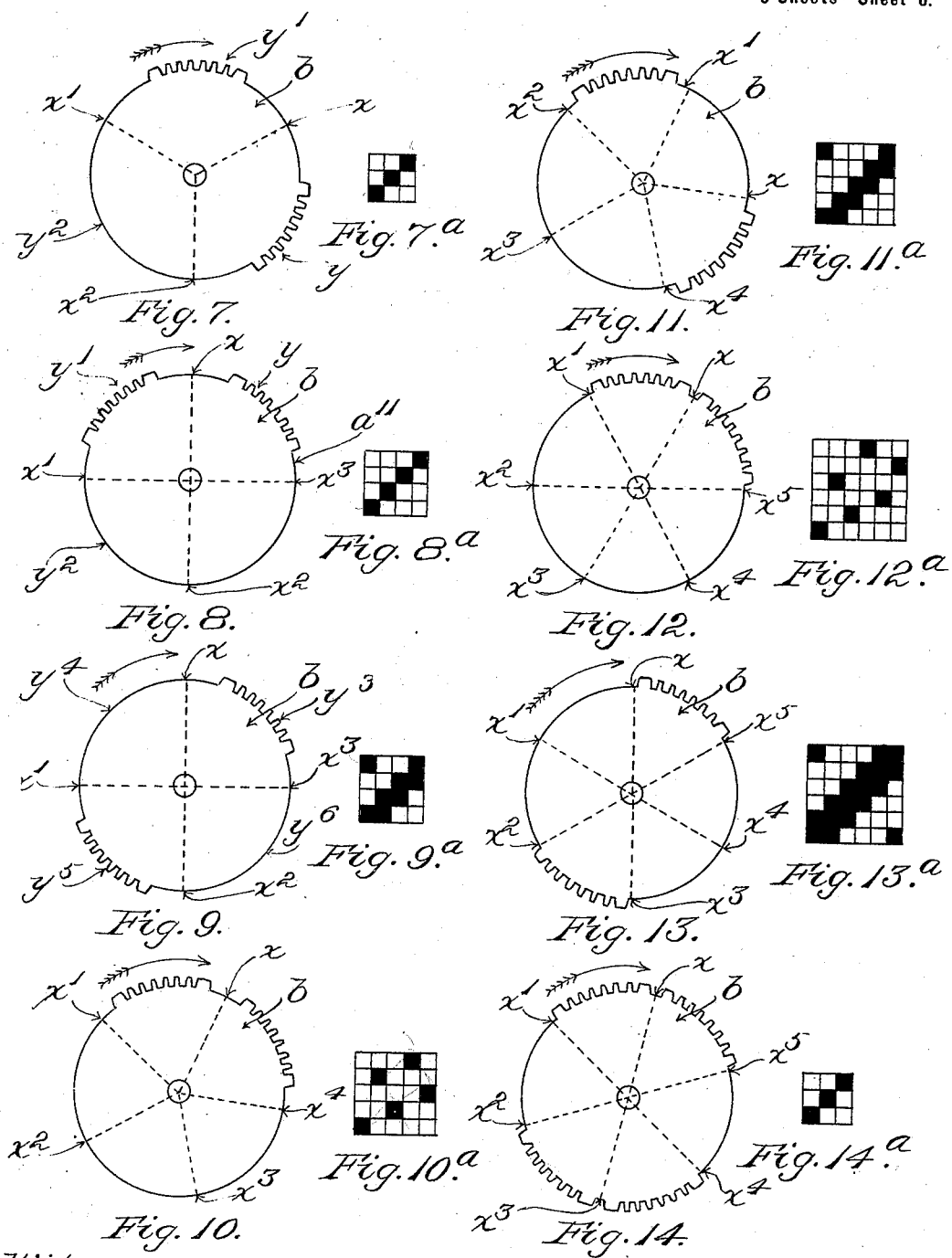

UNITED STATES PATENT OFFICE.

FRED LACEY, OF VALLEYFIELD, CANADA.

HARNESS-OPERATING MECHANISM FOR LOOMS.

SPECIFICATION forming part of Letters Patent No. 685,992, dated November 5, 1901.

Application filed May 23, 1901. Serial No. 61,510. (No model.)

*To all whom it may concern:*

Be it known that I, FRED LACEY, a citizen of the United States, residing at Valleyfield, in the county of Beauharnois, Province of Quebec, Dominion of Canada, have invented a certain new and useful Improvement in Harness-Operating Mechanisms for Looms, of which the following is a specification, reference being had therein to the accompanying drawings.

The objects of the invention are to produce a simple and practical construction of harness-frame-operating mechanism especially adapted to be employed in the production of regular weaves and also to produce a construction admitting of readily being changed from one such weave to another.

In the drawings, Figure 1 shows in front elevation harness-frame-operating mechanism for looms containing one embodiment of the invention. Fig. 2 shows the same in end elevation. Fig. 3 shows the same in plan. Fig. 4 is a view showing in elevation a second embodiment of the invention. Fig. 5 shows a third embodiment of the invention. Fig. 6 shows a fourth embodiment of the invention. Figs. 7 to 14 show different segment-gears, such as may be employed in producing the different weaves; and Figs. $7^a$ to $14^a$ are diagrams illustrative of the corresponding weaves.

Having reference to the drawings, only such parts are shown in the said drawings as are necessary to a proper understanding of the construction and mode of operation of the devices actually embodying the invention.

1 1, &c., are the harness-frames of the series employed in a loom, 2 2 is the harness-cording connected with the said harness-frames, and 3 3, &c., are the sheaves over which the said cording passes and by which the cording is guided and supported.

In connection with the series of harness-frames 1 1, &c., I employ a series of driven wheels or pinions, respectively having connections whereby to transmit motion to the respective harness-frames, and a series of rotating toothed drivers engaging with said driven wheels or pinions to rotate the latter, the said driven wheels or pinions and toothed drivers rotating on axes which normally are fixed in position relative to each other. The driven wheels or pinions of the illustrated embodiments of the invention are designated $a\ a$, &c., and the said toothed drivers are designated $b\ b$, &c. The driven wheels or pinions $a\ a$, &c., are independently rotatable. The toothed drivers $b\ b$, &c., are fast upon a shaft $b'$, which is mounted in suitable bearings on the framework and driven from one of the loom-shafts through suitable motion-transmitting connections. Herein for purposes of illustration I have shown the cam-shaft $c$ provided with a bevel-pinion $c'$, meshing with a bevel-gear $c^2$ on an upright shaft $c^3$, the latter carrying also a second bevel-gear $c^4$, in mesh with a bevel-gear $c^5$ on the shaft $b'$.

The relative rate at which the shaft $b'$ is driven in practice is determined by the number of picks in the pattern or weave which is required to be produced. The said shaft will be caused to complete one revolution for each repeat of the said pattern or weave or multiple thereof, as will be understood by those skilled in the art. For the purpose of enabling the said relative rate to be made to correspond with the requirements of a particular weave suitable provision will be made in connection with the motion-transmitting gearing. Any well-known or suitable rate-changing device may be employed. In the case of the illustrated arrangement it is contemplated that the gears $c'$ and $c^2$ shall be change-gears and shall be replaced whenever a change in the weave requires a change in the relative rate of movement of the shaft $b'$.

The character of the connections with which the driven wheels or pinions are provided for transmitting motion to the respective harness-frames may vary in practice. In Figs. 1, 2, and 3 each of said driven wheels or pinions has fast therewith an eccentric $a^3$, and the latter works within a slot $a$, which is formed within one arm of a harness-lever $a^5$, the said harness-lever having the harness-cording 2 connected therewith. In the present instance the cording extending from the top and bottom bars of a given harness-frame is connected with the opposite extremities of the corresponding harness-lever, and thereby the harness-frame is operated positively in both directions. Other arrangements of the cording, &c., may be adopted in practice.

As each driven wheel or pinion $a$ is rotated the eccentric connected therewith swings the corresponding harness-lever, and thereby occasions the required movements of the harness-frame. A half-revolution of the driven wheel or pinion and eccentric raises the harness-frame to lift its warp-threads into the upper plane of the shed, and the succeeding half-revolution thereof lowers the harness-frame to carry the said warp-threads into the lower plane of the shed.

In some embodiments of the invention each driven wheel or pinion $a$ has connected therewith a cam for operating the harness-lever or other device to which the harness-cording is connected. Thus in Fig. 4 I have shown the driven wheel or pinion $a$ as having fast therewith one form of cam, as $a^6$, which may be employed, the same being what is sometimes termed a "three-faced" eccentric and being arranged to work within the slot $a^4$ of the harness-lever $a^5$.

In the rotation of the shaft $b'$ the teeth of the toothed drivers $b$ $b$, &c., engage with the driven wheels or pinions $a$ $a$, &c., for the purpose of actuating the latter and moving the harness-frames which are in operative connection therewith. The precise form or character of the driver and of the driven wheels or pinions and the manner of their engagement with each other may be varied in practice. Preferably the drivers are provided with teeth arranged in segmental series at or adjacent the peripheries thereof, the segments of the respective drivers being set or arranged around the axis of the shaft $b'$, with such a lead relatively to one another as to cause them to engage with and actuate the respective driven wheels or pinions in the order that is necessary for the production of the sequence of movements of the harness-frames that is required for the desired weave. The manner in which the said segments are arranged in practice for the purpose of causing them to act in the required alternation or succession is indicated most clearly in Fig. 2 of the drawings.

Figure 1:
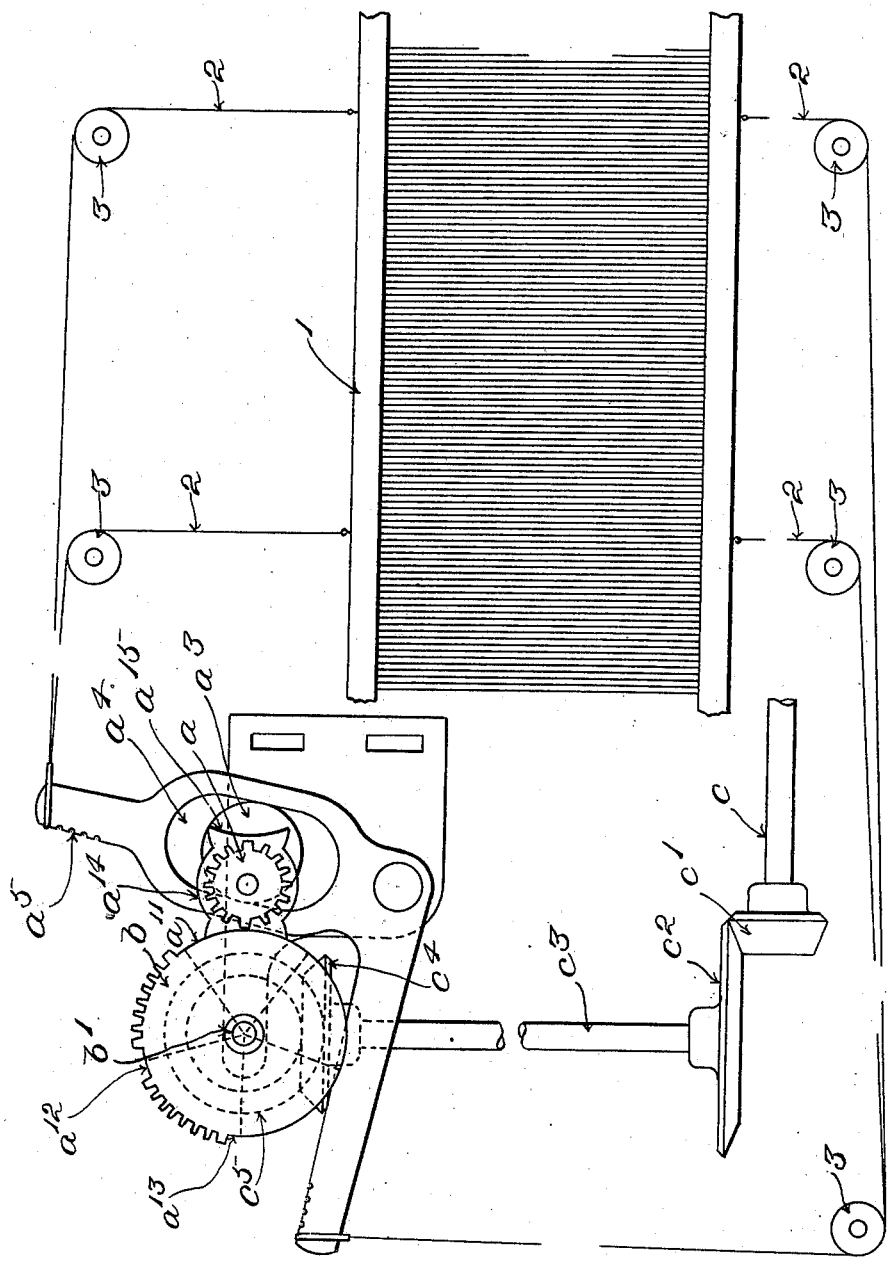
Figure 4:
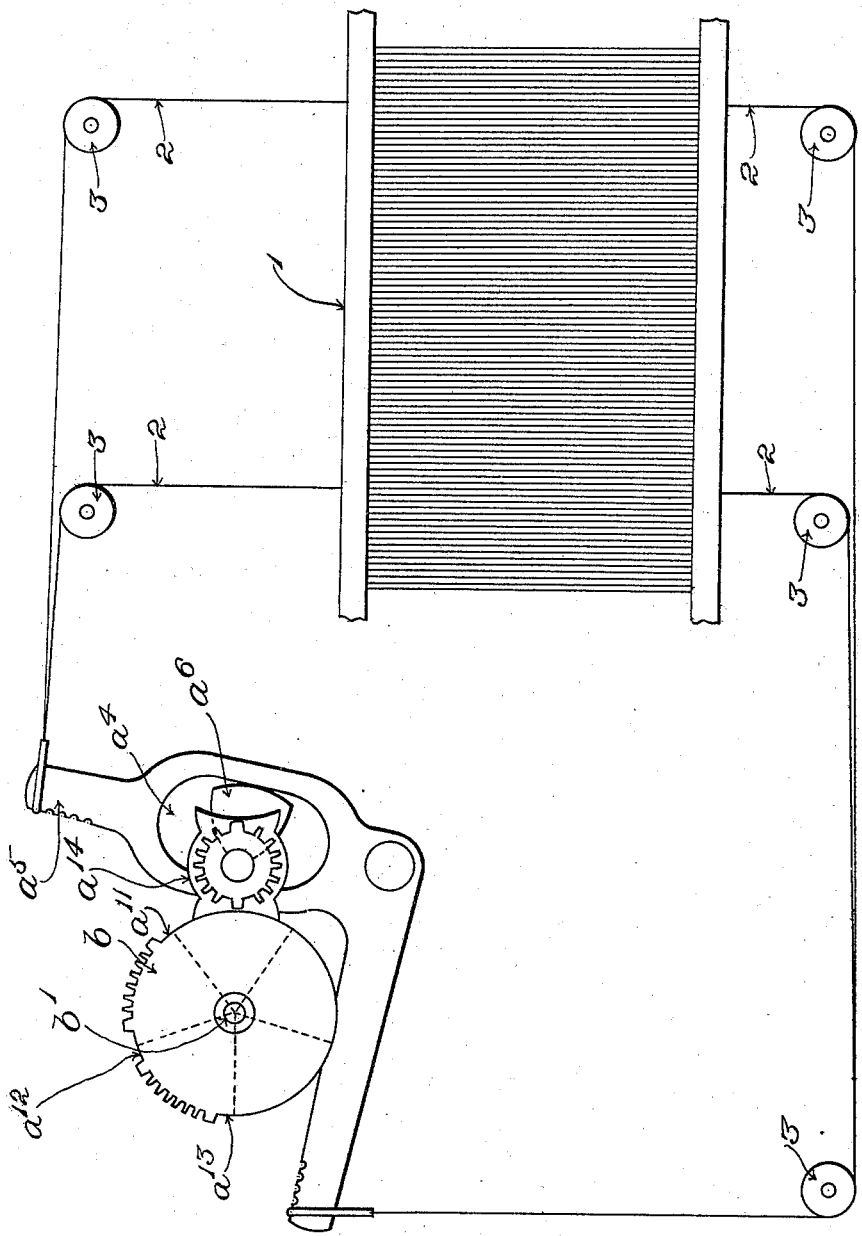
Figure 5:
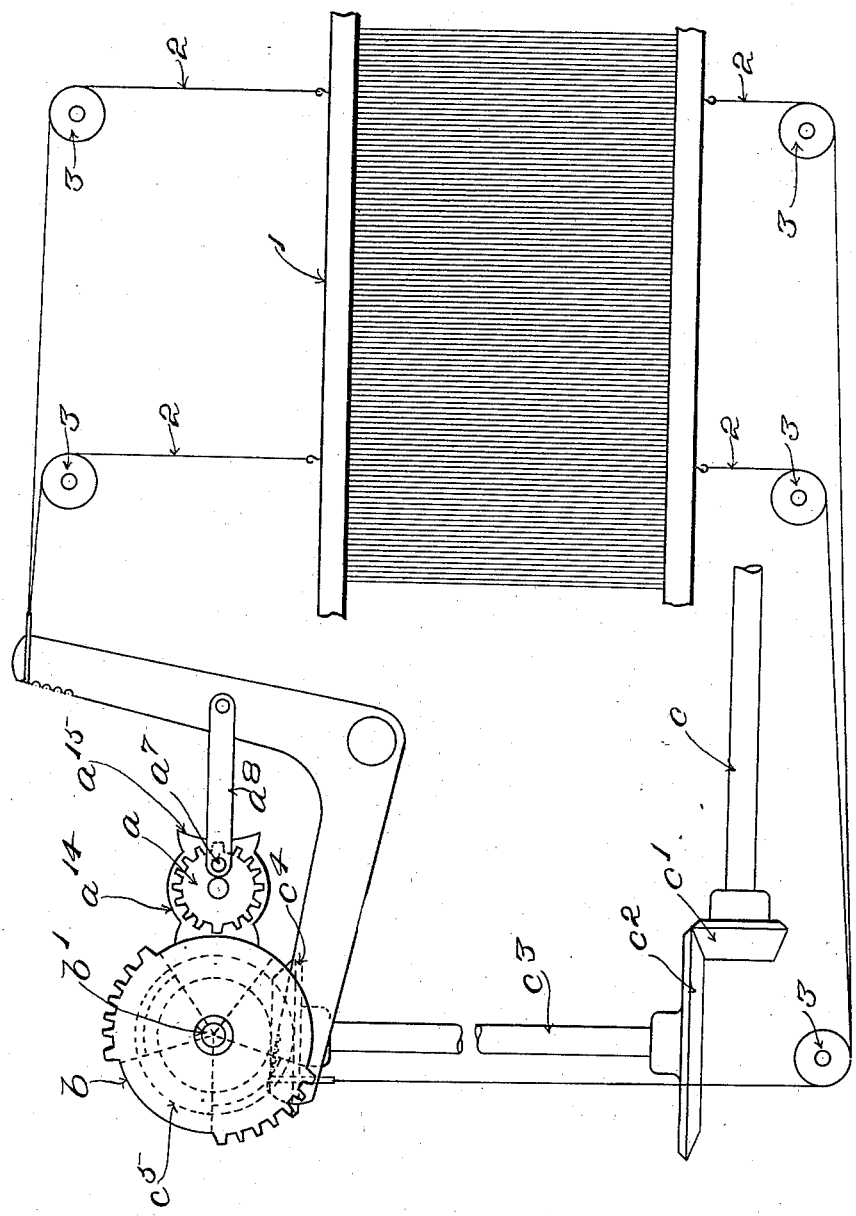
Fig. 5 shows an embodiment of the invention in which the driven wheel or pinion $a$ is furnished with a crank-pin $a^7$, which is connected by a rod $a^8$ with one of the arms of the corresponding harness-levers.
Figure 6:
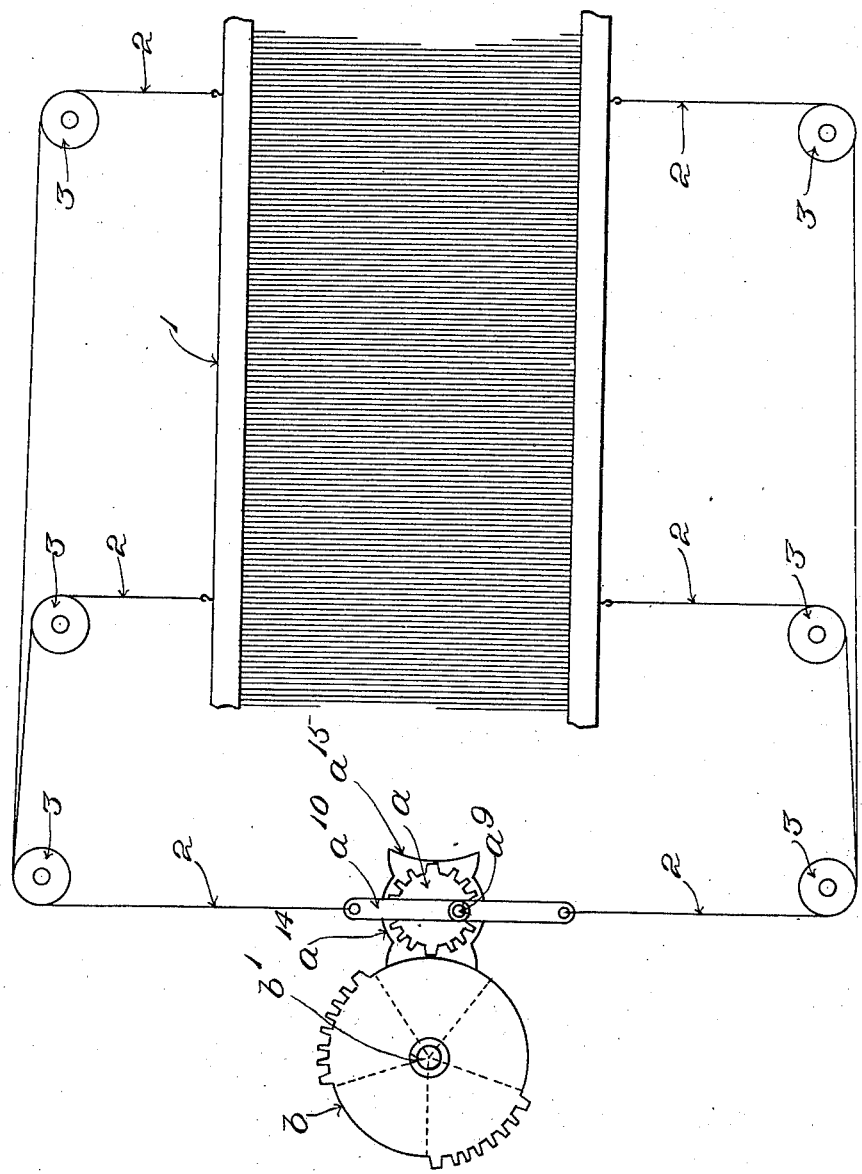
Fig. 6 shows an embodiment of the invention in which the driven wheel or pinion $a$ is furnished with a crank-pin $a^9$, to which latter is applied or connected a rod or bar $a^{10}$, having the harness-cording 2 2 connected with its upper and lower ends.

The arrangement of teeth upon each toothed driver $b$ will depend upon the character of the movements which the corresponding harness-frame is required to have given thereto. Throughout such portion of the toothed driver $b$ as corresponds with the dwell of the harness-frame in either position, up or down, the said driver is toothless, and consequently so long as such portion is presented to the corresponding driven wheel or pinion during the rotation of the driver the said wheel or pinion and the harness-frame that is operated therefrom are permitted to remain motionless. The driver may be furnished with one or more detached series of teeth, each comprising the number of teeth proper for moving the corresponding harness-frame from one position in shedding to another and operating to shift the said harness-frame after intervals of rest corresponding with the introduction of two or more picks, or two such series may be arranged in close succession, so as to act to shift the harness-frame into one position for a given pick and then shift it to a different position for the next succeeding pick. This latter arrangement is shown, for instance, in Fig. 1. Should it be desired to provide for dwells of the harness-frame at the time of the different picks, toothless spaces or blanks may be left on the driver at the portions thereof corresponding with the time for the picks, as at $a^{11}$ $a^{12}$ $a^{13}$ in Figs. 1 and 4. In many of the figures of the drawings the times of the various picks are indicated graphically by dotted radial lines on the toothed drivers. In Figs. 1 and 4 the blank $a^{11}$ at the beginning of the first series of teeth of the driver provides for a dwell corresponding with the time of one pick preceding the first change in position of the harness-frame. The blank at $a^{12}$ provides for a dwell of the harness-frame in its new position during the next pick, and the blank at $a^{13}$ provides for a dwell during the pick immediately succeeding the second change of position of the harness-frame, or the dwell of the harness-frame may be secured wholly by the shape, &c., of the motion-transmitting connections—as, for instance, it is secured in Fig. 4 by employing a so-called "three-face" eccentric $a^6$.

In Figs. 1 to 6 for the purpose of locking the driven wheels or pinions when they are not required to turn each thereof is furnished with a disk $a^{14}$, having concavities $a^{15}$ $a^{15}$ to receive the convex portion of the periphery of the disk $b^2$, fast with the driver $b$.

In practice the drivers $b$ $b$ are removably secured upon their shaft $b'$ and are replaced whenever necessary for the purpose of varying the weave in the same manner as is customary with the shedding-cams employed in other forms of harness-operating mechanism.

Figs. 7 to 14 illustrate the forms of toothed drivers which are employed in the production of the weaves which are represented by the accompanying diagrams, Figs. 7$^a$ to 14$^a$. Fig. 7 shows a three-harness gear, making one revolution to three picks $x$, $x'$, and $x^2$ of the loom. For the pick at $x$ the harness-frame is raised through the engagement of segment $y$ of the driver with the driven wheel. It is depressed for the pick at $x'$ through the engagement of segment $y'$ of the driver with the driven wheel and remains down for the pick at $x^2$ while the plain portion $y^2$ of the driver is presented to the driven wheel, thereby making the weave one up and two down, as in the diagram Fig. 7$^a$. Fig. 8 shows a four-harness gear, making one revolution to four picks $x\ x'\ x^2\ x^3$. For the pick at $x$ the harness-frame is raised through the engagement of segment $y$ of the driver with the driven wheel. It is depressed for the pick at $x'$ through the action of segment $y'$, and it remains down for the two picks $x^2$ and $x^3$ while the plain portion $y^2$ of the driver is presented to the driven wheel, thereby making the weave one up and three down, as in the diagram Fig. 8$^a$. Fig. 9 shows a four-harness gear, making one revolution to four picks $x\ x'\ x^2\ x^3$. For the pick at $x$ the harness-frame is raised through the engagement of segment $y^3$ of the driver with the driven wheel. It remains at rest while plain portion $y^4$ of the driver is presented to the driven wheel and until after pick $x'$. It is depressed for the pick at $x^2$ through the engagement of the segment $y^5$ with the driven gear, and remains at rest until after pick $x^3$ while plain segment $y^6$ is passing the driven wheel, thereby making the weave two up and two down, as represented in the diagram Fig. 9$^a$. Figs. 10 and 11 show five-harness gears, making one revolution to five picks and producing the respective weaves which are represented in the diagrams shown in Figs. 10$^a$ and 11$^a$. Fig. 10$^a$ shows a weave of one up and four down, and Fig. 11$^a$ shows a weave of two up and three down. Figs. 12 and 13 show six-harness gears arranged to produce, respectively, the weave of one up and five down that is represented in Fig. 12$^a$ and of three up and three down that is represented in Fig. 13$^a$. Fig. 14 shows a driver making one revolution in six picks of the loom, but employed for three-harness work and producing the same weave of one up and two down (shown in Fig. 14$^a$) as the driver of Fig. 7.

What I claim is—

1. In shedding mechanism for looms, in combination, the series of driven wheels respectively having operative connection with the respective harness-frames of a loom, and the toothed drivers rotating as a series and respectively engaging with said driven wheels to rotate the latter, the said driven wheels and toothed drivers rotating on axes which normally are fixed in position relative to each other.

2. In shedding mechanism for looms, in combination, the series of independently-rotatable driven wheels respectively having connections whereby to transmit motion to the respective harness-frames of a loom, and the segment-drivers rotating as a series and respectively engaging with said driven wheels to rotate the latter in the required sequence, the said driven wheels and drivers rotating on axes which normally are fixed in position relative to each other.

In testimony whereof I affix my signature in presence of two witnesses.

FRED LACEY.

Witnesses:
   CHAS. F. RANDALL,
   ARTHUR F. RANDALL.